Figure 1:
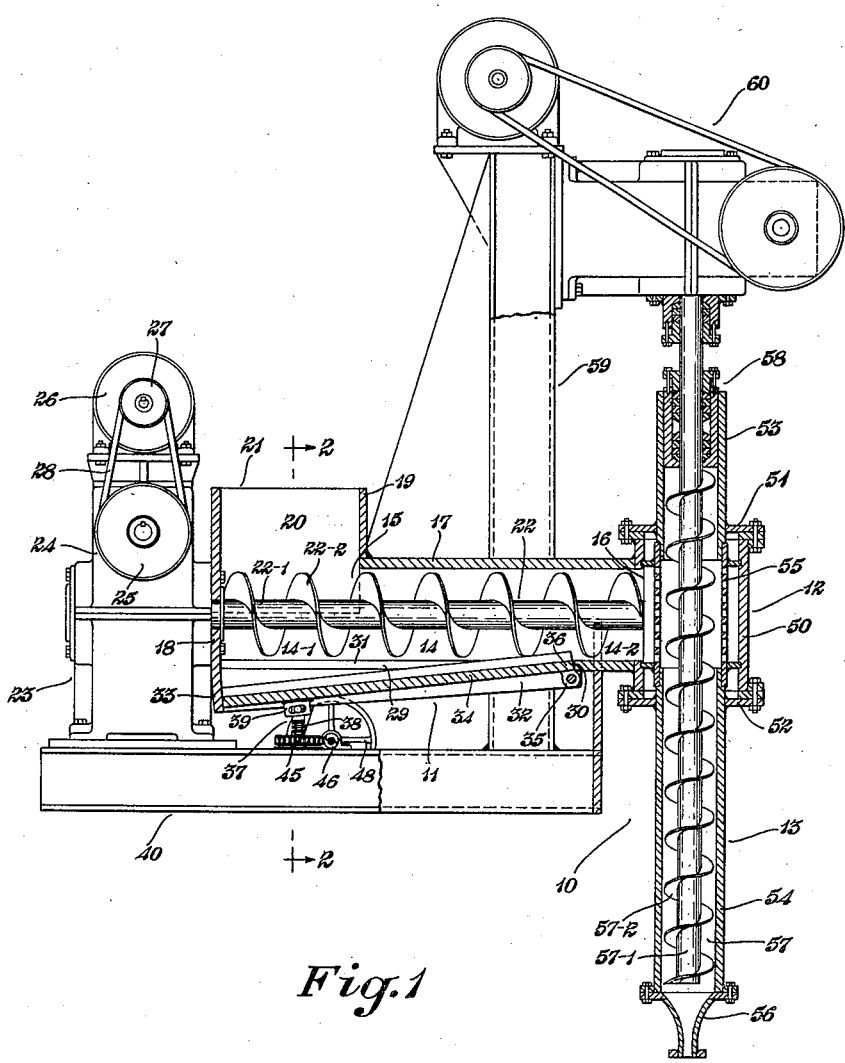

June 12, 1951  E. A. HAWK  2,556,391
SCREW CONVEYER APPARATUS

Filed Jan. 29, 1948  2 Sheets-Sheet 1

Inventor
Elwin A. Hawk
By Frease and Bishop
Attorneys

June 12, 1951 E. A. HAWK 2,556,391
SCREW CONVEYER APPARATUS
Filed Jan. 29, 1948 2 Sheets-Sheet 2

Inventor
*Elwin A. Hawk*

By
*Frease and Bishop*
Attorneys

Patented June 12, 1951

2,556,391

UNITED STATES PATENT OFFICE 2,556,391

SCREW CONVEYER APPARATUS

Elwin A. Hawk, East Rochester, Ohio

Application January 29, 1948, Serial No. 5,081

10 Claims. (Cl. 198—213)

The invention relates generally to screw conveyor apparatus and more particularly to screw conveyor apparatus used in the ceramic industry and frequently termed auger machines, and used for conveying or conveying and pressing plastic ceramic material in the manufacture of various classes of ceramic products such as the following: heavy ceramic products including brick, tile and the like; pottery including dinnerware and the like; and porcelain including electrical insulators and the like.

In the manufacture of ceramic products different ceramic bodies each having a different composition of ceramic materials are used from time to time in the same production line, and each particular ceramic body usually has a different resistance to the conveying or feeding action of any particular auger machine. On the other hand, in processing a particular ceramic body, its moisture content may change during preceding operations causing a change in its resistance to the auger conveying or feeding. It is desirable that the output of an auger machine, or of a screw conveyor apparatus which constitutes a component part of another machine or apparatus, be as nearly constant as possible, so that the output of the production line or the machine or apparatus of which the auger machine or screw conveyor apparatus is a part may be maintained as nearly constant as possible.

In usual auger machines or screw conveyor apparatus, either due to changes in the compositions of successive ceramic bodies constituting the input, or due to variations in the moisture content of a ceramic body having a particular composition and constituting the input, a variable output of the auger machine or screw conveyor apparatus is very frequently experienced.

While an auger machine or a screw conveyor apparatus frequently performs a pressing operation on the material conveyed therethrough, the present invention is more particularly directed to controlling the flow of material through an auger machine or a screw conveyor apparatus, and the words "screw conveyor apparatus," when used alone hereinafter throughout this specification including the claims, are intended to include an auger machine or a screw conveyor apparatus in which material is pressed as well as conveyed.

The objects of the present invention include the provision of improved screw conveyor apparatus which is adapted for having a variable material input and flow therethrough so as to maintain the material output as nearly constant as possible.

Further objects of the present invention include the provision of such variable screw conveyor apparatus, in which the parts are of simplified construction and arrangement, whereby the parts may be rapidly and economically manufactured, and easily and correctly assembled and disassembled, so that the apparatus may be economically produced and maintained.

The foregoing and other objects are attained by the screw conveyor apparatus, parts, combinations, and sub-combinations, which comprise the present invention and the nature of which is set forth in the following general statement, and preferred embodiments of which are set forth in the following description, and which are particularly and distinctly pointed out and set forth in the appended claims forming part hereof.

The nature of the improved screw conveyor apparatus of the present invention may be stated in general terms as including walls forming an elongated chamber having an inlet end and an outlet end and having an inlet opening at the inlet end and an outlet opening at the outlet end and the chamber forming walls including an elongated tubular wall through or into which the inlet and outlet openings communicate. An elongated screw is operatively mounted for rotation in the chamber, the axis of rotation of the screw extending in the same direction as the longitudinal axis of the tubular wall of the chamber. Opposite the screw, one of the chamber walls has formed therein an opening around sides of which extend flange walls, and within the flange walls there is operatively mounted a door for movement towards and away from the screw, whereby the volume of the chamber may be increased or decreased so that when the chamber is filled with material to be conveyed by the screw, the volume and mass of the material in the chamber may be set at a quantity producing a desired substantially constant output flow through the chamber outlet of material conveyed therethrough by the screw.

Figure 2:
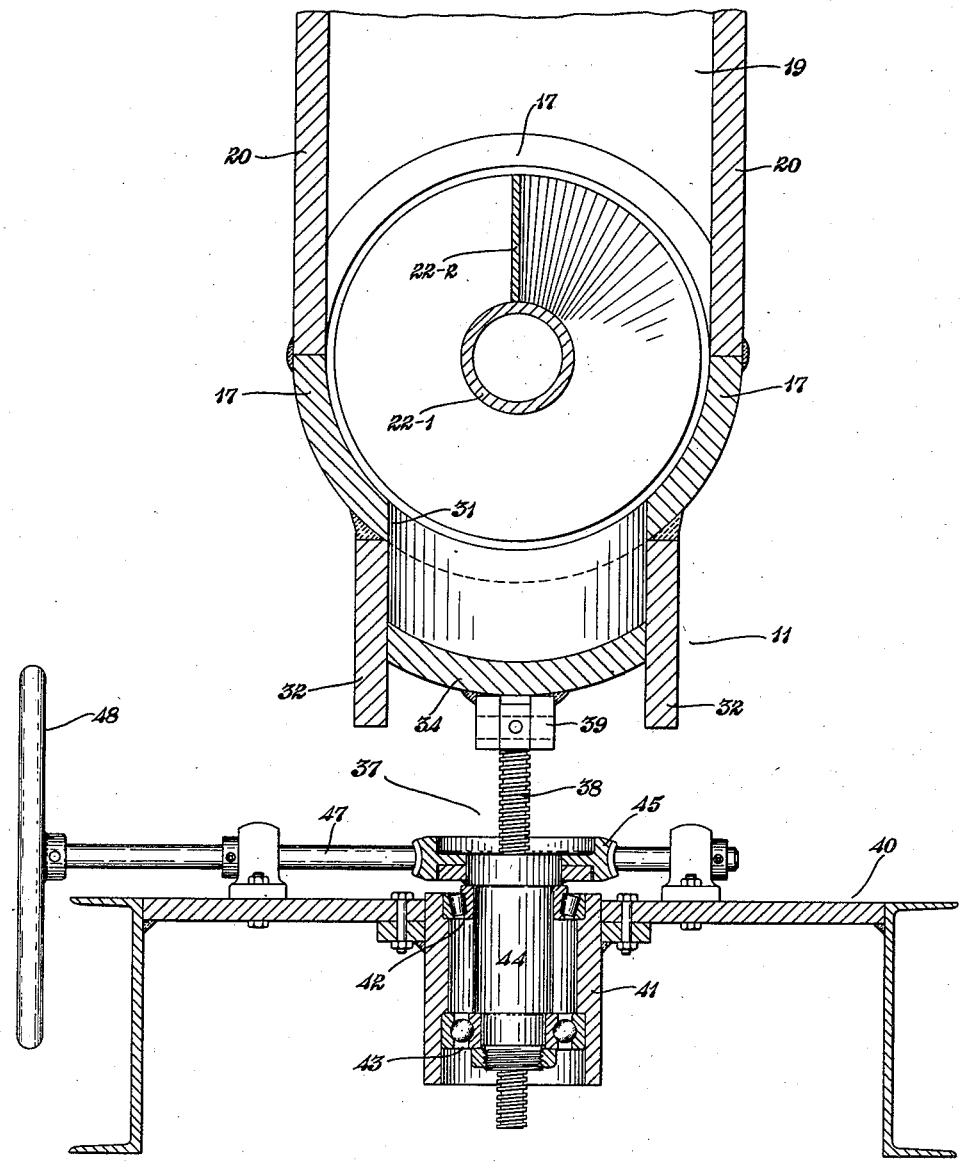

By way of example preferred embodiments of the improved screw conveyor apparatus and of improved parts thereof are illustrated in the accompanying drawing forming part hereof in which Figure 1 is a longitudinal vertical sectional view of an improved de-airing apparatus in which an embodiment of the improved screw conveyor apparatus is incorporated; and Figure 2 is a transverse sectional view thereof as on line 2—2, Fig. 1, showing details of the improved screw conveyor apparatus.

Similar numerals refer to similar parts throughout the drawings.

The improved de-airing apparatus indicated generally by 10 includes one embodiment of the improved screw conveyor apparatus of the present invention indicated generally by 11, and arranged to feed material into the chamber of a de-airing housing indicated generally by 12, and the de-airing housing 12 is associated with vertically extending extrusion press means indicated generally by 13.

The improved screw conveyor apparatus 11 of the present invention includes screw housing walls forming and having formed therein an elongated chamber indicated generally by 14 having an inlet end 14—1 with an upper inlet opening 15 and an outlet end 14—2 with an end outlet opening 16. The screw housing walls include an elongated preferably cylindric tubular wall 17, and a transverse end wall 18 at the inlet end of the chamber 14. The inlet opening 15, as shown, is formed in the upper side of the tubular wall 17; and an extension of the upper end of the end wall 18, a transversely extending wall 19 longitudinally spaced from the end wall 18 in the direction of the outlet opening 16, and laterally spaced side walls 20 joined with each other at corners form an upwardly opening rectangular hopper 21 communicating and connecting with the inlet opening 15.

Within the tubular wall 17, there extends longitudinally, and as shown coaxially, an elongated screw 22 including a cantilever screw shaft 22—1 on which is externally mounted a continuous thin walled helical screw blade 22—2. When desired separate screw blades may be mounted on the shaft 22—1. The screw shaft 22—1 extends through the end wall 18 into a bearing mounting and a connection with the drive gear of a usual reduction gear set indicated generally by 23 and contained in a housing 24 and having a driven pulley 25. A motor 26 has a drive pulley 27, and the motor drive pulley 27 is operatively connected by an endless belt 28 with the reduction gear set driven pulley 25.

For the purposes of the present invention, in the lower side of the tubular wall 17 below the screw 22 there is formed an elongated rectangular door opening 29 extending from the chamber end wall 18 to a transversely extending shorter side 30 located adjacent the outlet end 14—2 of the chamber 14, and the opening 29 has laterally spaced longer straight sides 31. Bordering each of the sides 31 of the opening there depends from the underside of the tubular wall 17 an elongated flat flange wall 32, and an opening bordering laterally extending arcuate flange wall 33 depends from the lower end of the chamber end wall 18, the arcuate flange wall 33 extending between and being connected at each of opposite corners with one of the longitudinally extending flange walls 32. A longitudinally extending rectangular door 34 fits the rectangular opening 29, and is preferably transversely cylindrically curved with the same curvature as that of the cylindrical tubular wall 17.

The door 34 is operatively mounted for movement towards and away from the screw 22 and into and out of the tubular wall opening 29 within and guided by the flange walls 32 and 33. The operative mounting for the movement of the door 34 as shown is effected by horizontal hinge means each indicated by 35 connecting the end 36 of the door adjacent the shorter side 30 of the opening 29 with one of the longitudinally extending flange walls 32.

Means for raising and lowering the door 34 by swinging on the hinge means 35 are provided as shown by screw jack means indicated generally by 37 located beneath the door 34 at the inlet end 14—1 of the chamber 14. The screw jack means 37 includes a vertically extending screw 38 having an upper pivotal connection 39 with the underside of the door 34.

As shown the parts of the de-airing apparatus 10 are ultimately carried by or are directly mounted on a base frame 40, and the screw jack means 37 furthermore includes a vertical bearing housing tube 41 having its upper end secured on the frame 40 and mounting in its upper end the outer raceway of a tapered roller bearing 42, and the tube 41 mounts in its lower end the outer raceway of a ball bearing 43. The inner raceways of the bearings 42 and 43 mount an elongated jack nut member 44 having upper and lower internally threaded portions which screw on the jack screw 38. On the upper end of the jack nut member 44 there is secured a worm wheel 45 with which is meshed a worm 46 on a shaft 47 journaled on the base frame 40, and the outer end of the shaft 47 has secured thereon a hand wheel 48 for turning the shaft 47, the worm 46, the worm wheel 45, and the jack nut member 44, and thereby raise or lower the jack screw 38 and the door 34.

The de-airing housing 12 includes a vertical tube 50 having upper and lower flanges connected with upper and lower annular plates 51 and 52. In the opening of the upper annular plate 51 there is secured as part of the vertically extending extrusion press means 13 an upper tube 53, the lower end of which terminates in the chamber of the housing 12, just below the upper annular plate 51. In the opening of the lower annular plate 52, as part of the vertically extending extrusion press means 13 there is secured a lower tube 54, the upper end of which terminates in the chamber of the housing 12 just above the lower annular plate 52. The upper and lower vertical tubes 53 and 54 are coaxial and have the same internal cylindric diameters. Between the ends of the tubes 53 and 54 in the chamber of the housing 50 there is located a perforated tube 55 whose internal cylindric diameter is slightly greater than that of the tubes 53 and 54. At the lower extremity of the lower tube 54 there is connected an extrusion die 56. Within the tubes 53, 54, and 55, there extends an elongated screw 57 including a screw shaft 57—1 and a continuous thin walled helical screw blade 57—2.

The housing 12 has a side opening seal connected with the outlet end of the tubular wall 17 of the screw conveyor apparatus 11, and all the walls of the housing 12 and the connecting tubes 53 and 54 and the connecting die 56 are sealed at their joints with each other. Packing gland means 58 seal the upper end portions of the screw shaft 57—1 in the upper end of the upper tube 53, and the upper end of the screw shaft 57—1 extends above the packing gland means 58. On a vertical frame indicated generally by 59, and extending upwardly from the base frame 40 motor and reduction gear drive means indicated generally by 60 are drive connected with the upper extremity of the screw shaft 57—1.

The chamber of the de-airing housing 12 is connected in a usual manner with an air pump not shown for producing a sub-atmospheric pressure in the chamber and pumping away the air or other gases in material passing therethrough.

The operation of the improved screw conveyor apparatus 11 is such that a substantially constant output of plastic material from the screw conveyor apparatus 11 may be caused to flow into the chamber of the de-airing housing 12. This plastic material, which may be for example a ceramic body for dinnerware, is filled into the chamber 14 of the screw conveyor apparatus 11 and to the top of the hopper 20. The screw 22 is then rotated so as to flow the plastic material from the inlet end 14—1 of the chamber 14 through the chamber 14 to the outlet end 14—2 thereof, and through the outlet opening 16 of the tubular wall 17 into the chamber of the de-airing housing 12. When the door 34 is at its lowermost position as shown in Fig. 1, there is a maximum resistance to the flow of the plastic material through the chamber 14, and when the door 34 fits in the opening 29 there is a minimum resistance to the flow of the plastic material through the chamber 14.

It is to be noted that the three flange walls 32 and 33 border and form a guideway for the door 34 in its movement, and as shown the flange walls 32 and 33 border the opening 29.

When desired the opening 29 may be smaller than the guideway formed by the flange walls 32 and 33. Also there may be four flange walls forming a rectangular guideway in which the door is arranged for reciprocating movement instead of swinging as shown.

Assuming for example that the plastic material being loaded into the hopper 20 has a varying moisture content, the operator rotates the handle 48 in opposite directions as may be required to raise or lower the door 34 to selected positions in the guideway to vary the resistance to the flow of material through the chamber 14 so as to maintain the flow of material into the chamber housing 12 and thus out of the die 56 so as to produce a substantially constant output or rate of flow of the column of de-aired material issuing from the die 56.

At any position of adjustment of the door 34 in the guideway, the worm operated screw jack means 37 locks and maintains the door in that position until the screw jack means 37 is again operated.

The embodiments of the present invention illustrated and described herein are by way of example, and the scope of the present invention is not limited to the same or to the particular details thereof but is commensurate with any and all novel subject matter contained herein which may at any time properly under the patent laws be set forth in the claims hereof or originating herein, and the elements of any such claims are intended to include their reasonable equivalents.

I claim:

1. In screw conveyor apparatus, screw housing walls forming and having formed therein an elongated chamber having an inlet end with an inlet opening and an outlet end with an outlet opening, an elongated screw operatively mounted for rotation in the chamber, one of the housing walls having a door opening formed therein, flanges extending along sides of the door opening and forming a door guideway, and a door fitting in the guideway and operatively arranged for movement to and locking at any selected position in the guideway.

2. In a screw conveyor apparatus, screw housing walls forming and having formed therein an elongated chamber having an inlet end with an inlet opening and an outlet end with an outlet opening, an elongated screw operatively mounted for rotation in the chamber, one of the housing walls having a door opening formed therein, flanges extending along sides of the door opening and forming a door guideway, a door fitting in the guideway and operatively arranged for movement to selected positions in the guideway, and means for moving the door to and maintaining it at any selected position in the guideway.

3. In screw conveyor apparatus, screw housing walls forming and having formed therein an elongated chamber having an inlet end with an inlet opening and an outlet end with an outlet opening, an elongated screw operatively mounted for rotation in the chamber, one of the housing walls having a door opening formed therein, flanges extending along sides of the door opening and forming a door guideway, a door fitting in the guideway and operatively mounted for movement to selected positions in the guideway, and jack means for moving the door to and maintaining it at any selected position in the guideway.

4. In screw conveyor apparatus, screw housing walls forming and having formed therein an elongated chamber having an inlet end with an inlet opening and an outlet end with an outlet opening, an elongated screw operatively mounted for rotation in the chamber, one of the housing walls having a door opening formed therein, flanges extending along sides of the door opening and forming a door guideway, a door fitting in the guideway and operatively mounted for movement to selected positions in the guideway, and worm operated screw jack means for moving the door to and maintaining it at any selected position in the guideway.

5. In screw conveyor apparatus, screw housing walls forming and having formed therein an elongated chamber having an inlet opening and an outlet end with an outlet opening, the housing walls including an elongated tubular wall, an elongated screw operatively mounted for rotation in the chamber and extending within the tubular wall, the tubular wall having a door opening formed therein, flanges extending along sides of the door opening and forming a door guideway, and a door fitting in the guideway and operatively arranged for movement to and locking at any selected position in the guideway.

6. In screw conveyor apparatus, screw housing walls forming and having formed therein an elongated chamber having an inlet end with an inlet opening and an outlet end with an outlet opening, the housing walls including an elongated tubular wall, an elongated screw operatively mounted for rotation in the chamber and extending within the tubular wall, the tubular wall having a door opening formed therein, flanges extending along sides of the door opening and forming a door guideway, and a door fitting in the guideway and operatively arranged for movement to and locking at any selected position in the guideway, the tubular wall being transversely curved, and the door being transversely curved with the same curvature as the tubular wall.

7. In screw conveyor apparatus, screw housing walls forming and having formed therein an elongated chamber having an inlet end with an inlet opening and an outlet end with an outlet opening, an elongated screw operatively mounted for rotation in the chamber, one of the housing walls having a door opening formed therein, flanges extending along sides of the door opening and forming a door guideway, and a door fitting in the guideway and operatively arranged for swinging movement to and locking at any selected position in the guideway.

8. In screw conveyor apparatus, screw housing walls forming and having formed therein an elongated chamber having an inlet end with an inlet opening and an outlet end with an outlet opening, an elongated screw operatively mounted for rotation in the chamber, one of the housing walls having a door opening formed therein, flanges extending along sides of the door opening and forming a door guideway, a door fitting the guideway, and means hinge mounting the door at one side of the opening, and means for swinging the door on the hinge means to and maintaining the door at any selected position in the guideway.

9. In screw conveyor apparatus, screw housing walls forming and having formed therein an elongated chamber having an inlet end with an inlet opening and an outlet end with an outlet opening, an elongated screw operatively mounted for rotation in the chamber, one of the housing walls having a door opening formed therein, flanges extending along sides of the door opening and forming a door guideway, a door fitting the guideway, and means hinge mounting the door at one side of the opening, and jack means for swinging the door on the hinge means to and maintaining the door at any selected position in the guideway.

10. In screw conveyor apparatus, screw housing walls forming and having formed therein an elongated chamber having an inlet end with an inlet opening and an outlet end with an outlet opening, an elongated screw operatively mounted for rotation in the chamber, one of the housing walls having a door opening formed therein, flanges extending along sides of the door opening and forming a door guideway, a door fitting the guideway, and means hinge mounting the door at one side of the opening, and worm operated jack means for swinging the door on the hinge means to and maintaining the door at any selected position in the guideway.

ELWIN A. HAWK.

REFERENCES CITED

The following references are of record in the file of this patent:

UNITED STATES PATENTS

| Number | Name | Date |
|---|---|---|
| 1,706,292 | Heyman | Mar. 19, 1929 |
| 2,249,588 | Waddle | July 15, 1941 |
| 2,343,707 | Roland | Mar. 7, 1944 |
| 2,412,121 | Bradshaw | Dec. 3, 1946 |